United States Patent [19]
Woodworth et al.

[11] Patent Number: 5,182,464
[45] Date of Patent: Jan. 26, 1993

[54] HIGH SPEED TRANSFER SWITCH

[75] Inventors: George K. Woodworth, Gainesville; Forrest K. Smith, Nokesville, both of Va.

[73] Assignee: Techmatics, Inc., Arlington, Va.

[21] Appl. No.: 639,070

[22] Filed: Jan. 9, 1991

[51] Int. Cl.$^5$ .............................. H02J 3/10
[52] U.S. Cl. ...................... 307/87; 307/64
[58] Field of Search ............ 307/19, 20, 23, 29, 307/43–47, 64, 67, 68, 84, 87; 361/44, 47, 48, 51, 20, 21; 322/8

[56] References Cited

U.S. PATENT DOCUMENTS

| | | | |
|---|---|---|---|
| 4,096,395 | 6/1978 | Bogel et al. | 307/64 |
| 4,405,867 | 9/1983 | Moakler et al. | 307/64 |
| 4,475,047 | 10/1984 | Ebert, Jr. | 307/66 |
| 4,520,275 | 5/1985 | Marusik | 307/64 |
| 4,761,563 | 8/1988 | Ross et al. | 307/87 |
| 4,782,422 | 11/1988 | Jones et al. | 361/87 |
| 4,811,136 | 3/1989 | Jones et al. | 361/79 |
| 4,812,943 | 3/1989 | Jones et al. | 361/92 |
| 4,814,934 | 3/1989 | Jones et al. | 361/88 |
| 4,879,624 | 11/1989 | Jones et al. | 361/65 |

FOREIGN PATENT DOCUMENTS 1432661 10/1988 U.S.S.R.
1401488 7/1975 United Kingdom.

Primary Examiner—A. D. Pellinen
Assistant Examiner—Aditya Krishnan
Attorney, Agent, or Firm—Venable, Baetjer & Howard

[57] ABSTRACT

A high speed transfer switch is provided for transferring a multiphase load among a number of multiphase A.C. power sources. If the initially selected source deviates from desired limits, the transfer switch transfers the load to an alternate source on a phase-by-phase basis. Antiparallel-connected SCRs are used to allow the load current in each phase to commutate to zero before the load is transferred to the alternate power source.

49 Claims, 11 Drawing Sheets

HIGH SPEED TRANSFER SWITCH

BACKGROUND OF THE INVENTION

1. Field of the Invention

The present invention relates generally to electrical switching systems, and is specifically concerned with a high speed transfer switch that is capable of transferring a multiphase load between different multiphase A.C. power sources on a phase-by-phase basis in such a manner as to insure a stable and continuous delivery of power to the load.

2. Description of the Prior Art

Brief electrical outages in a power distribution system frequently cause long lasting impact to the equipment fed by the system. These outages may only last a fraction of a second in duration, are often sporadic in nature, and can occur without warning. Despite their brevity, such power outages can be sufficient to cause data processing systems and other sensitive equipment to lose memory and other stored information. Disruption of internal memory may cause these systems to stop and reload their control programs, or they may simply cease to operate altogether. The uncoordinated operation of these machines may be life threatening and may place significant amounts of property and money at risk. The loss of control in a hospital, automotive assembly plant, or banking institution computer are but a few of the many possible examples.

Most power disturbances are caused by the transfer of switches used to select power generation and transmission equipment for maintenance or reconfiguration following the failure of a component. The loss of operation experienced by most electronic equipment results from the depletion of internally stored energy following the power outage. This need not occur, for virtually all equipment can "ride through" very short losses of power. If the duration of the outage can be held to less than about 0.25 millisecond, the internal circuitry of most equipment will not be depleted and will continue to operate normally.

The power distribution system most common in the United States and aboard aircraft platforms is the three-phase "wye" system shown in FIG. 1. The center of the three phases A, B and C is referred to as the neutral terminal and is typically connected in some manner to an earth or ground potential. The three phases are 120° out of phase with each other and electrically rotate around the neutral terminal at a rate corresponding to the frequency of the power source. The neutral terminal may be used in conjunction with any one conductor to provide a source of single phase power, as shown in FIG. 2.

A number of different types of switching systems have been proposed for transferring multiphase loads between different multiphase A.C. power sources. In the simplest type of system, the load is disconnected simultaneously from all phases of the primary power supply and is then reconnected simultaneously to the corresponding phases of the backup or standby power supply. Because this changeover cannot be effected instantaneously, the load is left without power momentarily and disruptions of the type described above can occur. In a second type of system, which may be referred to as a "make before break" system, the load is momentarily connected in parallel between the two power sources as the transfer is taking place. This has the advantage of avoiding any temporary interruption of power to the load, but at the expense of possible damage to the power generation equipment or to sensitive loads as a result of differences in voltage, frequency or phase angle between the two power sources. The phenomenon of "motoring", in which one of two interconnected generators drives the other, can also occur in this situation.

Systems have also been proposed for transferring a load between two multiphase A.C. power sources on a phase-by-phase basis. In one known type of system, the detection of a trip condition in one phase of the primary power source causes that phase to be disconnected immediately from the load using transistor switching elements. The remaining phases may be disconnected at the same time as the first phase, or when the load current in each of the remaining phases reaches zero, depending on the particular manner in which the system is implemented. In either case, however, the system does not allow the phases of the backup power source to be connected to the load until the source voltage in each phase reaches zero. This is done in order to prevent current surges through the transistor switching elements, but it also has the effect of interrupting power to the load for an unnecessarily long period of time. This interruption can approach 1 millisecond in a 400 Hz power system, and can exceed 6 milliseconds in a 60 Hz power system. This time period is sufficiently lengthy to allow sensitive electronic equipment to fail due to the absence of power.

In a second known type of multiphase load transfer system, a matrix of antiparallel-connected silicon controlled rectifier (SCR) pairs is used to transfer the load between two power sources on a phase-by-phase basis. When a failure condition in the primary power source necessitates a transfer of the load to the secondary power source, the individual SCRs of the matrix are gated in such a manner as to momentarily connect each load phase in parallel between the primary source and the particular phase of the secondary source that matches the load phase voltage most closely. During this interval, the source phase having the higher voltage supplies power to the load. When the source phases commutate, the SCRs associated with the primary power source automatically turn off as the current passing through them reaches zero. This "make before break" switching procedure is advantageous in that it minimizes the interruption of power to the load, but it also requires that the individual SCRs of each antiparallel-connected SCR pair be controlled independently of one other in order to avoid loop currents from occurring between the two power sources. In addition, the dynamic matching procedure that is carried out between the phases of the load and those of the new power source introduces computational difficulties that are not encountered in systems which maintain the same phase relationship when transferring a load between different power sources.

SUMMARY OF THE INVENTION

The present invention provides a high speed transfer switch which is capable of transferring a multiphase load between different multiphase A.C. power sources with minimal interruption of power to the load. The transfer switch monitors each of the available power sources and initially connects the load to a source that is within the desired voltage and frequency limits. If the selected source deviates from these limits, or if an external transfer condition is detected, the transfer switch automatically transfers the load to an alternate source on a phase-by-phase basis. Self-commutating switching devices, such as triacs or antiparallel-connected SCRs, are used to allow the load current in each phase to commutate naturally to zero before the load is transferred to the alternate power source. Zero current switching minimizes the time during which the load is without power, and also reduces voltage transients caused by the interruption of current to motors and other inductive loads. A considerable simplification over previously proposed matrix-type SCR switching systems is obtained by connecting each load phase to only one source phase at a time, and by maintaining the same load-to-source phase relationship when the load is transferred from one source to another. This makes it possible to control the SCRs in pairs rather than individually, and reduces the number of SCRs and other components that are required to implement the system. In addition, since load current in a given phase is allowed to flow from only one source at a time, the zero current condition that precedes the transfer of each load phase to the new source can be detected by monitoring the load directly, rather than by monitoring the current flowing to the load from the individual sources.

In accordance with one aspect of the present invention, a high speed transfer switch for transferring a multiphase load between first and second multiphase A.C. power sources comprises switching means for selectively connecting each phase of the load to the corresponding phase of the first or second power source; load current monitoring means for detecting a zero current condition in each phase of the load; and control means coupled to the switching means and to the load monitoring means. The control means is responsive to a detected transfer condition to cause the switching means to independently transfer each phase of the load from the first power source to the second power source upon detection of a zero current condition in that phase by the load current monitoring means. The detected transfer condition may comprise a voltage or frequency fault in one or more phases of the first power source, or an external transfer condition resulting from a manual input or other external occurrence.

In a preferred embodiment of the invention, the switching means comprises a first plurality of self-commutating switching devices (such as triacs or antiparallel SCRs) associated with the respective phases of the first power source, and a second plurality of self-commutating switching devices associated with the respective phases of the second power source. Each of the switching devices is rendered conductive in response to a gating signal produced by the control means, and automatically reverts to a nonconducting state when the gating signal is removed and the current passing through the switching device becomes zero. The control means responds to a detected transfer condition by simultaneously removing gating signals from the switching devices associated with all phases of the first power source, thereby allowing the load current in each phase to commutate to zero, and by selectively applying gating signals to the switching device associated with each phase of the second power source when the load monitoring means detects a zero current condition in the corresponding load phase.

When the switching devices comprises antiparallel-connected SCR pairs, as in the preferred embodiment, the SCRs of each pair can be gated simultaneously by the control means and need not be controlled individually.

BRIEF DESCRIPTION OF THE DRAWINGS

The various objects, advantages and novel features of the invention will be more readily apprehended from the following detailed description when read in conjunction with the appended drawings, in which.

Throughout the drawings, like reference numerals will be understood to refer to like parts and components.

DETAILED DESCRIPTION OF THE PREFERRED EMBODIMENT

Figure 1:
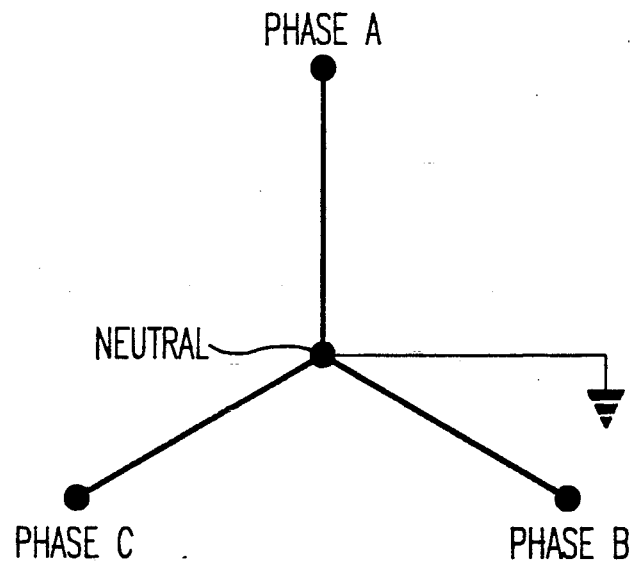
FIG. 1 is a schematic diagram illustrating a three-phase, wye-connected power system having a neutral terminal connected to a ground potential.
Figure 2:
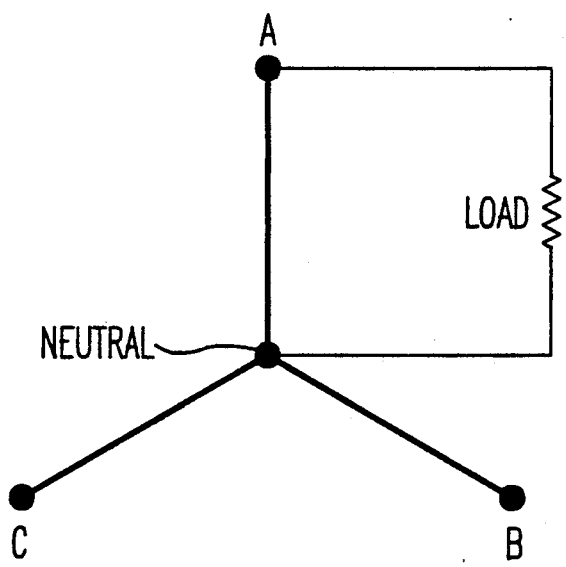
FIG. 2 illustrates the manner in which the neutral terminal of a three-phase, wye-connected power system may be used in combination with any one conductor to provide a source of single-phase power.
Figure 3:
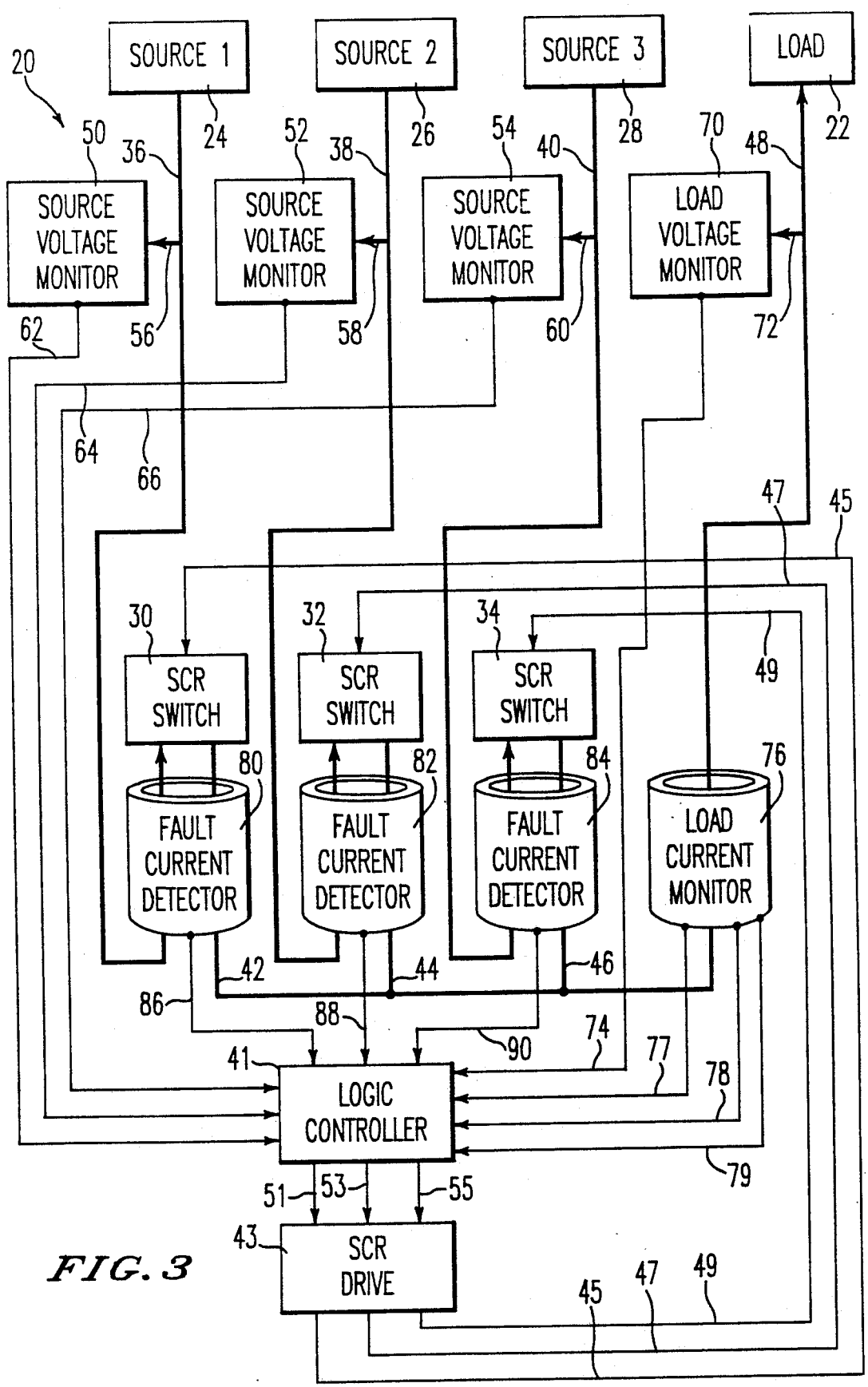
FIG. 3 is a block diagram illustrating a high speed transfer switch for transferring a three-phase load among different three-phase A.C. power sources in accordance with the present invention.

A high speed transfer switch 20 constructed in accordance with the principles of the present invention is illustrated in block diagram form in FIG. 3. The transfer switch 20 functions to transfer a three-phase load 22 among a number of three-phase A.C. power sources 24, 26 and 28. Although not specifically shown, both the load 22 and the power sources 24, 26 and 28 are connected in a neutral-referenced "wye" configuration as illustrated in FIG. 1. It should also be understood that, although three power sources are shown, the present invention can be used with a greater or lesser number of power sources if desired.

The power sources 24, 26 and 28 of FIG. 3 are connected to corresponding three-phase silicon controlled rectifier (SCR) switching networks 30, 32 and 34 by means of conductors 36, 38 and 40. These conductors, although illustrated as single lines in the interest of simplicity, each consist of three separate electrical conductors corresponding to the three electrical phases of the corresponding power source. The SCR networks 30, 32 and 34 are connected by similar conductors 42, 44 and 46 to a load bus 48 which supplies power to the three-phase load 22. The SCR switching networks 30, 32 and 34 are individually controlled by gate signals received from an SCR drive circuit 43 via corresponding signal lines 45, 47 and 49. The SCR drive circuit 43 is, in turn, controlled by a microprocessor-based logic controller 41 by means of signal lines 51, 53 and 55. As will be described in more detail below in connection with FIGS. 4, 9 and 10, the signal lines 45, 47 and 49 each consist of six separate conductor pairs for independently controlling the gate-to-cathode voltage of each SCR in the corresponding switching network 30, 32 or 34, while the signal lines 51, 53 and 55 each consist of three separate conductors for the three phases A, B and C of each switching network.

In order to detect fault conditions in the power sources 24, 26 and 28 in FIG. 3, source voltage monitors 50, 52 and 54 are coupled to the respective three-phase supply lines 36, 38 and 40 by means of taps 56, 58 and 60. The outputs of the source voltage monitors 50, 52 and 54 are connected by signal lines 62, 64 and 66 to the logic controller 41. As will be described in more detail hereinafter, the source voltage monitors 50, 52 and 54 are capable of monitoring all phases of the corresponding power source 24, 26 or 28, so that the system can detect and respond to power source faults occurring in a single phase or in multiple phases.

With continued reference to FIG. 3, the load bus 48 is connected to a load voltage monitor 70 by means of a tap 72. The load voltage monitor 70 produces an output which is coupled by means of a signal line 74 to the logic controller 41. In addition to the load voltage monitor, a load current monitor 76 comprising a set of sensing coils or Hall effect devices is placed in surrounding relationship with the load bus 48 to monitor each phase of the load current. The phase A, B and C outputs of the load current monitor 76 are coupled by means of signal lines 77, 78 and 79 to the logic controller 41.

Associated with the SCR networks 30, 32 and 34 are corresponding fault current detectors 80, 82 and 84 which are placed in surrounding relationship with respective pairs of the three-phase lines 36, 38, 40 and 42, 44, 46 leading to and from the switching networks. The fault current detectors 80, 82 and 84 may consist of sensing coils or Hall effect devices, and perform a current summing function to insure that the source and load currents are equal for the switching network that is currently supplying power to the load 22. If this condition is not satisfied, a phase-to-phase or phase-to-ground short circuit may be present in the switching network, a situation which will usually necessitate a complete shutdown of the system (i.e., disconnection of the load 22 from all three power sources 24, 26 and 28). In order to initiate such action, the fault current detectors 80, 82 and 84 produce output signals which are coupled to the logic controller 41 by means of signal lines 86, 88 and 90.

Figure 4:
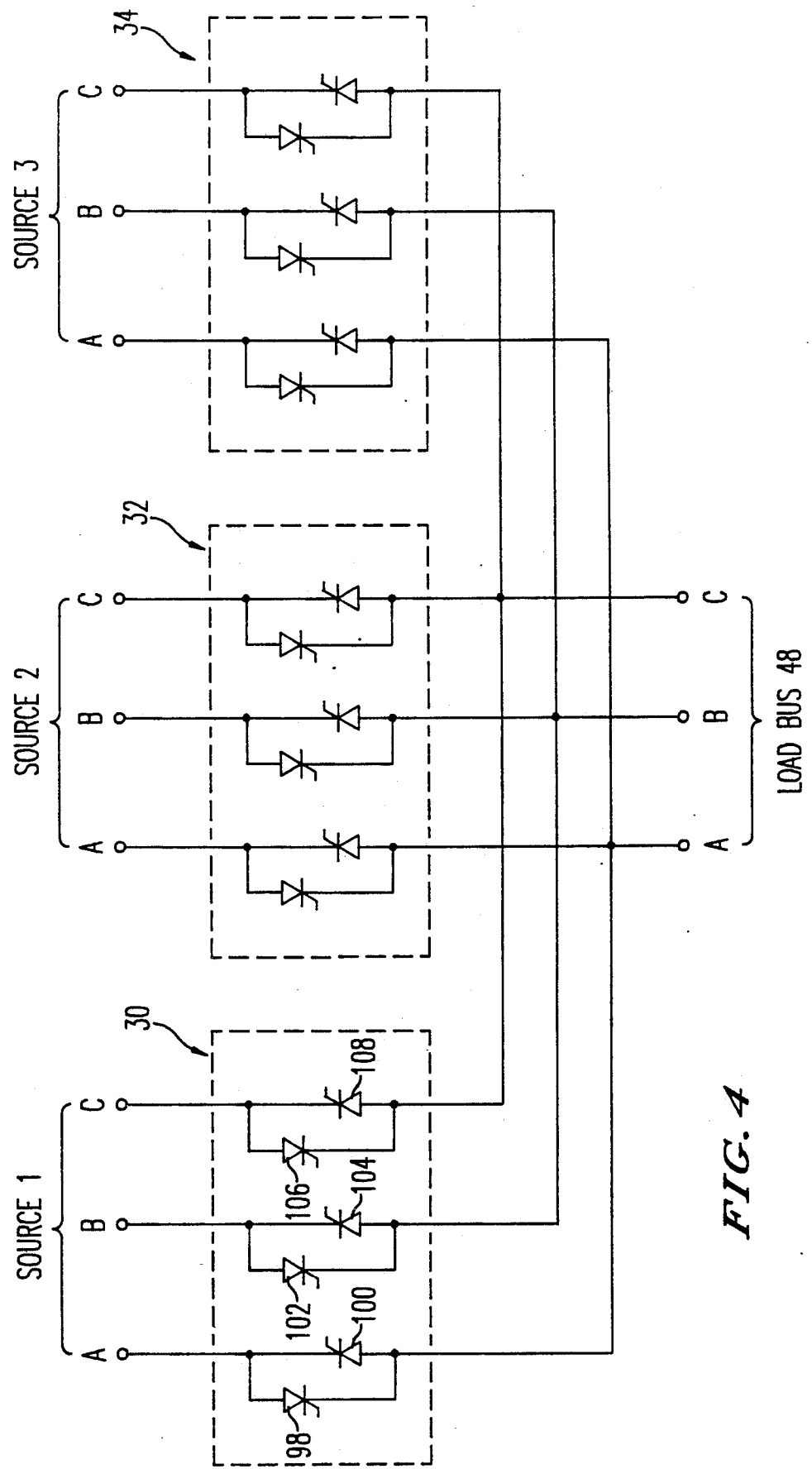
FIG. 4 illustrates the arrangement of antiparallel-connected SCR pairs that are used as switching devices in the preferred embodiment of the present invention.

FIG. 4 is a schematic diagram illustrating in detail the construction of the SCR switching networks 30, 32, 34 and the manner in which these networks interconnect the power sources 24, 26, 28 with the load bus 48. Since all of the switching networks are identical, a description of the first switching network 30 will suffice for the remaining networks 32, 34. The inputs to the switching network 30 consist of the three output phases A, B and C of the first power source 24. Within the switching network 30, the current in phase A is controlled by a pair of silicon controlled rectifiers (SCRs) 98, 100 which are connected in an antiparallel configuration as shown. The current in phase B is controlled in a similar manner by two antiparallel-connected SCRs 102, 104, and the current in phase C is controlled by two further antiparallelconnected SCRs 106, 108. Silicon controlled rectifiers, sometimes referred to a thyristors, are gated four-layer solid state devices with regenerative or self-commutating switching properties that allow them to remain in a conductive state after gate drive is removed for as long as current continues to flow from the anode to the cathode. Six individual gate signal inputs are provided to the SCRs 98-108 by the SCR drive circuit 43 in a manner which will be described below in connection with FIG. 10.

As illustrated in FIG. 4, the phase A outputs from the SCR switching networks 30, 32 and 34 are all coupled to phase A of the load bus 48, and the same is true of the phase B and C outputs from the three switching networks. In this way, it is possible to connect any one of the sources 24, 26, or 28 to the load 22 by applying gating signals to the appropriate lines 45, 47 or 49. This function is carried out by the logic controller 41 and SCR drive circuit 43 of FIG. 3. It should be noted that, since the SCR pairs controlling each phase of the switching networks 30, 32 and 34 can be gated on or off individually, transfer of the load 22 from one power source to another can be accomplished on a phase-by-phase basis. This is important in minimizing the interruption of power to the load during the transfer process.

Figure 5:
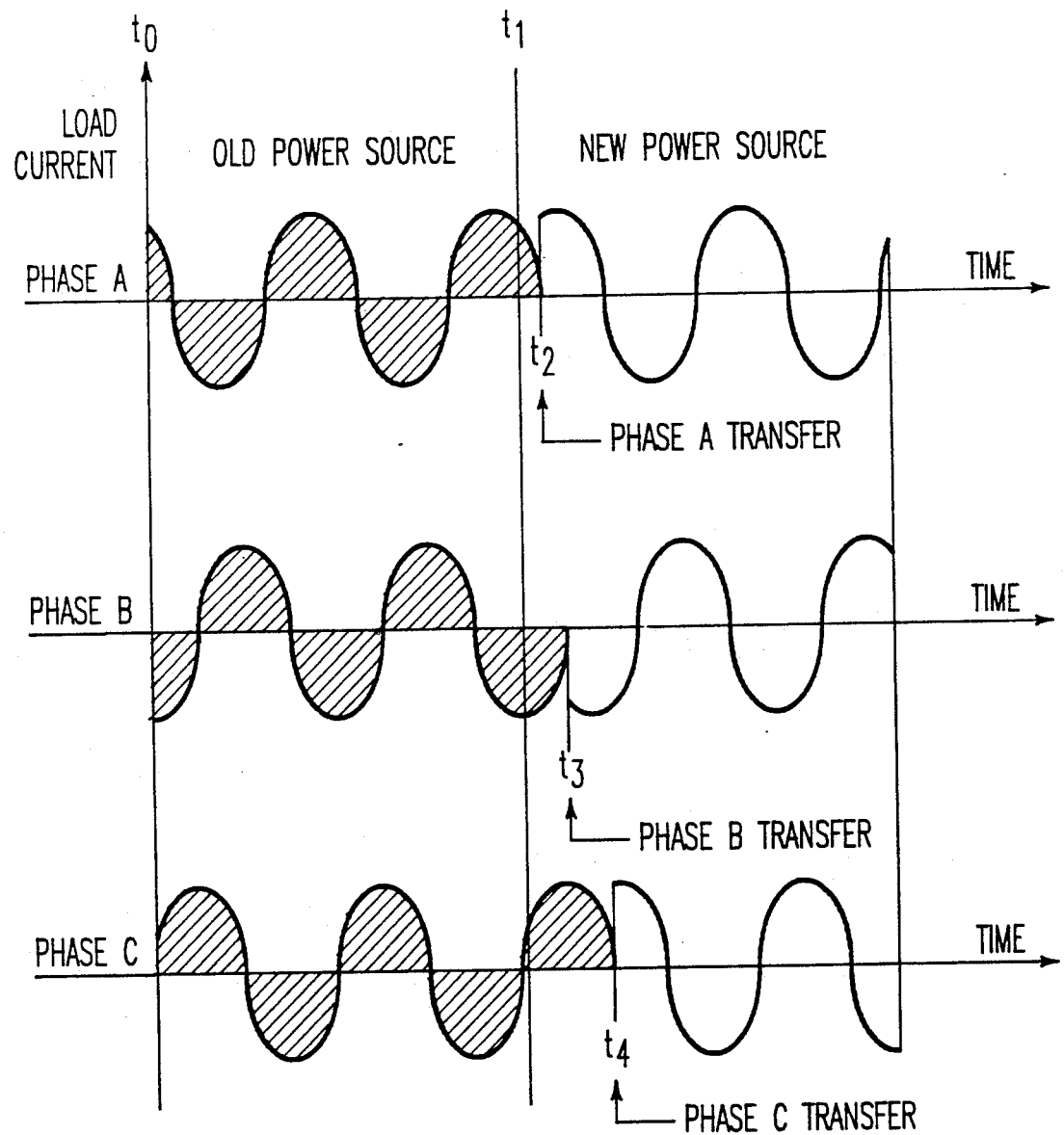
FIG. 5 is a graphical illustration of the manner in which SCR commutation is carried out in each phase of the high speed transfer switch during transfer of a three-phase load from one power source to another power source.

FIG. 5 is a set of graphs illustrating the manner in which SCR commutation is carried out within the switching networks 30, 32 and 34 during a transfer from one power source to another. A separate graph is provided for each of the phases A, B and C of the three-phase system shown in FIG. 3. In each graph, the vertical axis represents load current and the horizontal axis represents time, the latter axis being the same for all three phases. The 120° phase offset that can be observed between successive waveforms is characteristic of a three-phase system.

The crosshatched waveforms in FIG. 5 represent the current being supplied to the load 22 by the particular power source 24, 26 or 28 that is connected to the load at time $t_0$. Merely for the purpose of illustration, this source is assumed to be the first source 24 of FIG. 3. It is further assumed that, at a later time $t_1$, a voltage fault is detected in one or more phases of the source 24 by the source voltage monitor 50 of FIG. 1. This causes a signal to be applied to the logic controller 41, which responds by causing the SCR drive circuit 43 to simultaneously remove the gate drive from all three SCR pairs associated with the first switching network 30. However, the logic controller 41 does not immediately reconnect the load to a new power source, but instead waits until the current in each phase leg of the load is detected to be zero by the load current monitor 76 of FIG. 3. The zero current switching points in phases A, B and C of the load occur at times $t_2$, $t_3$ and $t_4$, respectively, in the graphs of FIG. 5. During the time intervals $(t_2-t_1)$, $(t_3-t_1)$ and $(t_4-t_1)$, current flow to the load will continue due to the regenerative nature of the SCRs used in the switching network 30.

When the zero current point $t_2$, $t_3$ or $t_4$ is reached in the respective load phase A, B or C, two events occur at essentially the same time. First, the particular SCR that was conducting prior to that time reverts automatically to a nonconductive state, since it is no longer being supplied with a gate drive signal. Second, the logic controller 43 responds to the detection of zero current in the load phase of interest by gating on the SCR pair in the corresponding phase leg of the switching network associated with the new power source. For the purpose of the present example, the new source will be assumed to be the second power source 26. By gating on one phase of the SCR switching network 32, the logic controller 41 and SCR drive circuit 43 reconnect the disconnected load phase to the proper phase leg of the second power source 26. As a result, current begins to flow to the load 22 from the source 26 as indicated by the non-crosshatched waveforms in FIG. 5. This process is repeated in sequence for each of the three load phases A, B and C. In this way, the transfer of the load 22 from the first power source 24 to the second power source 26 occurs at three separate and distinct points in time, spaced by 120° from one another. In effect, the load is "walked" from one power source to the other, one phase leg at a time, and is never left completely without power.

In practice, there will be a brief switching delay between the instant when the SCR pair associated with a given phase leg of the first power source 24 ceases to conduct and the instant when the corresponding SCR pair associated with the same phase leg of the second power source 26 begins to conduct. However, this delay is sufficiently short that it will not affect most types of equipment, particularly since it occurs in only one phase at a time. Reconnection of the load to the new source is completed rapidly and well before the stored electrical energy within most types of electronic loads has been significantly depleted. Rotating machinery and equipment, due to inertia, will not change speed detectably and will continue to function without incident.

As will be apparent from FIG. 5, there may be a phase offset between the old and new power sources due to lack of generator synchronization or other factors. This can result in a momentary current surge through the switching network of the new power source when the SCRs of that network are initially gated into conduction. However, due to the brevity of the power outage, this surge will usually be less than the normal inrush current for a given load. Properly sized SCRs can tolerate such current surges without damage, and it is for this reason that the use of SCRs in the switching networks 30, 32 and 34 is particularly preferred. However, other types of solid state four-layer devices, such as triacs, may also be used. A triac functions essentially as a pair of antiparallel-connected SCRs, and hence one triac may be substituted for each pair of SCRs in the switching networks 30, 32 and 34. Non-solid-state switching devices such as thyratrons may also be useful as switching devices in the present invention, particularly when very high load current levels are involved.

In the operation of the present invention, it is preferred that the selected SCR pairs of the switching networks 30, 32 and 34 be fully gated on in a saturated manner, as opposed to being operated in a partial or phase-controlled manner. This eliminates turn-on or "cut-in" disturbances, and assures that the output voltage waveform applied to the load will faithfully match that of the power source. Full 360° conduction of the selected SCR pairs also avoids difficulties associated with reactive loads having high circulating currents.

The relative phase angle of the current associated with the load 22 may be displaced from the voltage waveform by the presence of reactive load current. The operation of the high speed transfer switch 20 is intrinsically unaffected by these phase shifts. As will be apparent from FIG. 5, the SCRs associated with each phase of the new power source are not gated on until after the SCRs associated with the corresponding phase of the old power source have stopped carrying current, as detected by the load current monitor 76 of FIG. 3. As a result, the gating on of the SCRs associated with the new power source will not be affected by any phase shift in the load voltage waveform.

Figure 6:
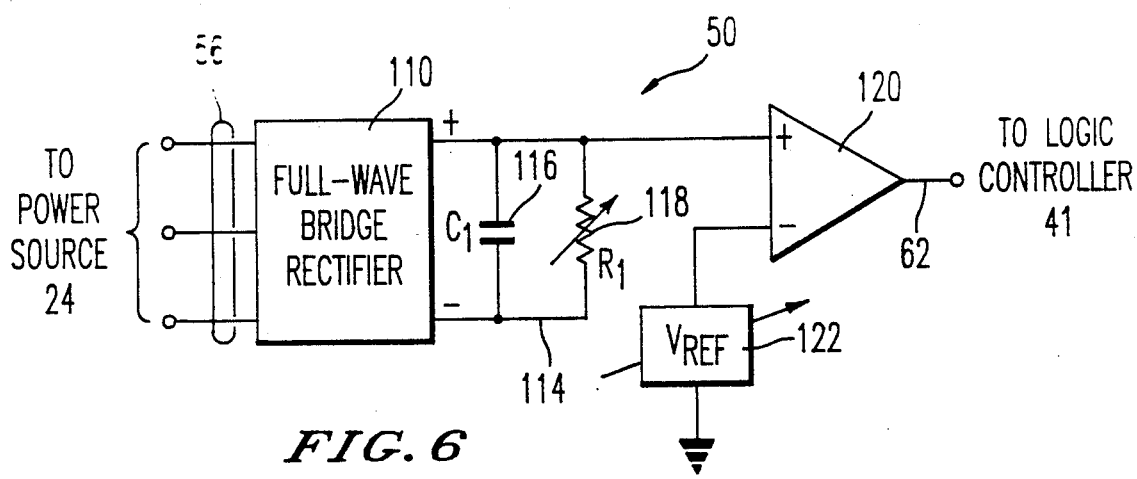
FIG. 6 illustrates in detail one of the source or load voltage monitors used in the high speed transfer switch of FIG. 3.

FIG. 6 is a schematic diagram of the source voltage monitor 50 of FIG. 1. The remaining source voltage monitors 52 and 54 are identical in construction, and hence will not be described in detail. The function of the source voltage monitor 50 is to continuously monitor all three phases of the output of the first power source 24, in order to detect certain fault conditions. These fault conditions may include a phase voltage which is not within certain predetermined limits, or the complete absence of one or more phases due to a short circuit or other fault in the power source. To detect these fault conditions, the source voltage monitor 50 includes a three-phase, full-wave bridge rectifier 110 which is connected to all three phases A, B and C of the first power source 24 by means of tap lines 56A, 56B and 56C. These lines collectively form the tap line 56 shown in FIG. 3. The full-wave bridge rectifier 110 produces a rectified (i.e., single-polarity) output on lines 112 and 114, and this output is connected across a smoothing capacitor 116. A variable resistor 118 is connected in shunt across the capacitor 116 to form an integrating circuit having a time constant $R_1C_1$. The line 112, on which the voltage across the capacitor 116 appears, is connected to the non-inverting input of a voltage comparator 120. The inverting input of the comparator 120 is connected to a reference voltage source 122 whose output corresponds to a selected threshold level of the average line voltage appearing on line 112.

In situations where all phases of the power source 24 are operating normally, the average line voltage on line 112 will be above the threshold value established by the reference voltage source 122, and the voltage comparator 120 will produce a high logic level on its output line 62. However, a reduction in voltage in one or more of the source phases will cause the voltage on line 112 to decay at a rate determined by the time constant $R_1C_1$. If this voltage drops below that of the reference voltage source 122, the output of the voltage comparator 120 on line 62 will transition to a low logic level. The occurrence of the low logic level is interpreted by the logic controller 41 of FIG. 3 as an indication of a fault in the first power source 24, and the logic controller responds by transferring the load 22 to one of the other sources 26 or 28 in the manner described previously.

Preferably, the rectifier circuit 110 used in the source voltage monitor 50 incorporates a three-phase transformer in order to reduce the output voltage of the power source 24. This makes it possible to obtain an output voltage from the rectifier 110 that is within the input range of commonly available voltage comparators 120. It is also preferred that the reference voltage source 122 be adjustable, so that the threshold voltage that is compared with the rectified output voltage on line 112 can be changed to suit the requirements of the load. The use of a variable resistor 118 in the integrating circuit is also useful in accommodating different types of loads, since a change in the resistance value will have the effect of varying the amount of time that a source voltage fluctuation will be tolerated before a load transfer will be initiated. This time period will ordinarily be selected in accordance with the sensitivity of the particular load 22 to momentary power source fluctuations.

If desired, the source voltage monitor 50 may be modified to check not only the voltage but also the frequency of each phase of the first power source 24. In the period of one sine wave, there are six voltage crossover points in a three-phase system. These crossover points may be detected and counted by suitable counting circuits and zero crossing detectors in the modified source voltage monitor 50 to accurately measure the frequency of the power source on a phase-by-phase basis. If one or more phases of the power source are outside certain specified frequency limits, the modified source voltage monitor 50 will indicate a fault condition to the logic controller 41. A fault condition will also be indicated when two or more phases have shorted together, since fewer crossover points per cycle will be detected in this situation.

The construction of the load voltage monitor 70 of FIG. 3 is similar to that of the source voltage monitor 50 just discussed, and hence need not be described in detail. The function of the load voltage monitor 70 is to determine whether the voltage being supplied to the load 22 is within specified limits. If one or more SCR pairs in the particular switching network 30, 32 or 34 currently supplying power to the load 22 are not operating properly due to an open-circuited SCR or a defective SCR drive circuit, the resulting low output voltage is detected by the load voltage monitor 70. The load voltage monitor 70 responds by causing the output on line 74 to transition to a low logic level, which in turn causes the logic controller 41 of FIG. 3 to initiate transfer of the load 22 to one of the alternate power sources. Since the alternate power source employs a different SCR switching network, the load transfer will ordinarily remove the fault condition and restore the load voltage to a normal value. The use of the load voltage monitor 70 is advantageous in that it allows certain types of internal system failures to be detected and corrected in essentially the same manner as external power source failures.

Figure 7:
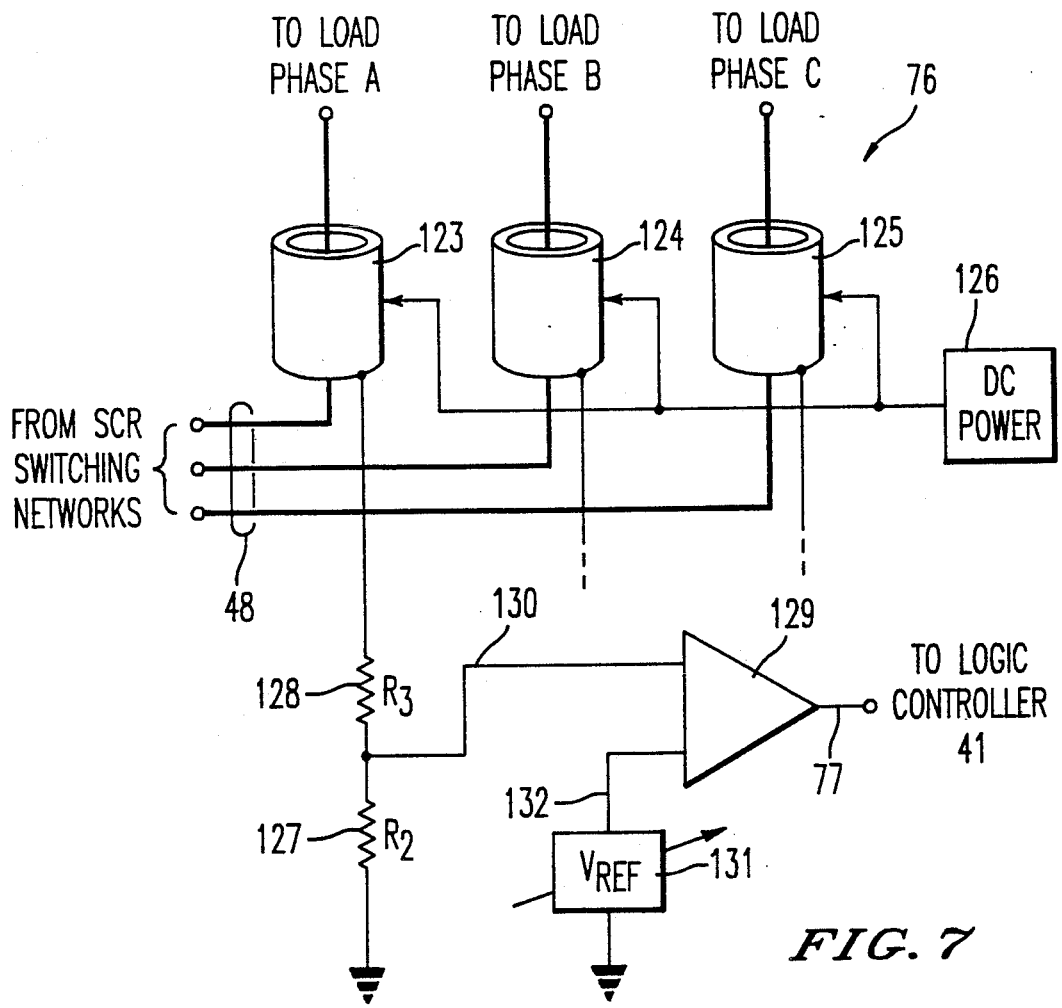
FIG. 7 illustrates in detail the load current monitor used in the high speed transfer switch of FIG. 3.

FIG. 7 is a schematic diagram of the load current monitor 76 of FIG. 3. The function of the load current monitor 76 is to continuously monitor the current in all three phases of the load bus 48, and to produce output signals on lines 77, 78 and 79 when the load current in the corresponding phase momentarily passes through zero. In order to accomplish this, the load current monitor 76 comprises three current sensing devices 123, 124 and 125, each placed in surrounding relationship with the corresponding phase conductor A, B or C of the load bus 48. The sensing devices 123, 124 and 125 may consist of sensing coils, current transformers, Hall effect devices, or the like. When a Hall effect device is used, a source of DC power is provided as indicated at 126. In order to provide appropriate input signals to the logic controller 41 of FIG. 3, each of the sensing devices 123, 124 and 125 is connected to a suitable voltage window comparator circuit. In the interest of simplifying the illustration, only the comparator circuit associated with the sensing device 123 is shown in FIG. 7. It will be understood that identical comparator circuits are employed for the sensing devices 124 and 125 in order to provide the remaining inputs to the logic controller 41.

With continued reference to FIG. 7, the input side of the comparator circuit comprises a voltage divider formed by two scaling resistors 127, 128 connected in series. The output of the current sensing device 123 is applied across the voltage divider, and the node between the resistors 127 and 128 is connected to the signal input of a window comparator 129 by means of a signal line 130. The reference input of the comparator 129 is connected to an adjustable DC reference voltage source 131 by means of a further signal line 132. The output of the comparator appears on line 77 and is applied as an input to the logic controller 41 of FIG. 3

In operation, the output of the comparator 129 on line 77 will be at a high logic level whenever the current in phase A of the load is above or below the zero axis by more than a predetermined threshold value, established by the DC reference source 131. As the load current waveform approaches zero during each positive or negative half-cycle, the output on line 77 will transition to a low logic level when the predetermined threshold value is reached. This logical transition provides the logic controller 41 of FIG. 3 with an indication that the load current in phase A has effectively reached zero, so that phase A of the load can be transferred to a new power source. The comparator circuits associated with the current sensing devices 124 and 125 will be understood to operate in a similar manner in order to produce outputs on lines 78 and 79, respectively, of FIG. 3. The same DC reference voltage source 131 may be connected in parallel to all three comparator circuits, if desired.

Figure 8:
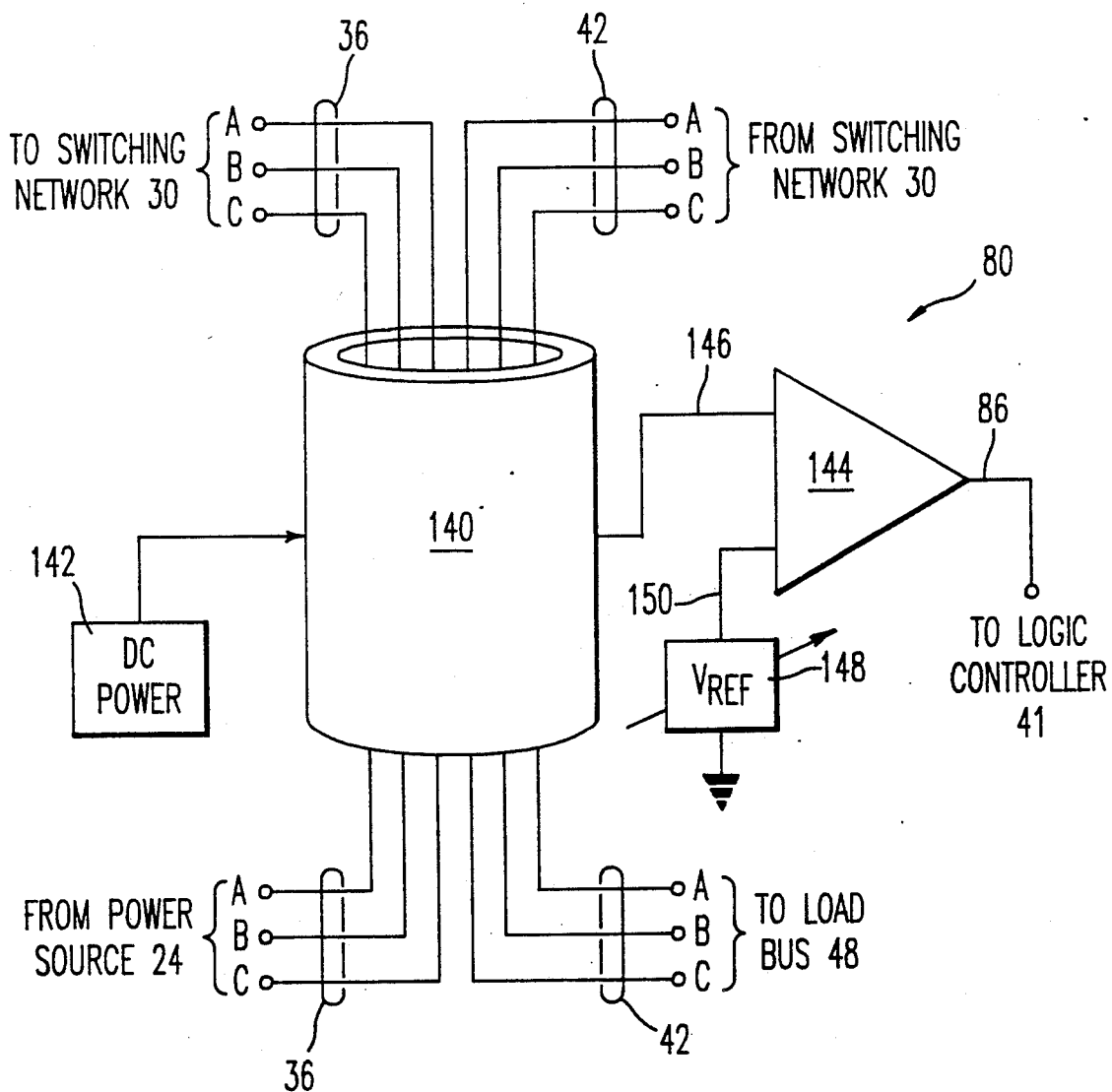
FIG. 8 illustrates in detail one of the fault current monitors detectors used in the high speed transfer switch of FIG. 3.

FIG. 8 is a schematic diagram of the fault current detector 80 of FIG. 3. The construction of the remaining fault current detectors 82 and 84 is identical, and hence will not be described in detail. The purpose of the fault current detector 80 is to determine whether there are any short circuits in the internal wiring or switching components of the SCR switching network 30. This is done by employing a current summing device to verify that the source and load currents flowing to and from the switching network 30 are equal, and hence that there are no phase-to-phase or phase-to-ground paths present in the switching network. The current summing device produces an output signal when the amplitudes of the input and output currents do not null. Typically, this would indicate a short circuit to the heat sink of one of the SCR switching devices in the switching network 30, which is a potentially hazardous situation. The monitoring operation is carried out continuously by the logic controller 41, and is utilized to initiate a system shut-down in the event that a fault of this type is detected.

In order to carry out the current summing function described above, the fault current detector 80 includes a current sensing device 140 which is placed in surrounding relationship with all three phases A, B and C of the input line 36 leading from the power source 24 to the switching network 30, and with all three phases A, B and C of the output line 42 leading from the switching network 30 to the load bus 48. As in the case of the load current monitor discussed previously, the sensing device 140 may consist of a sensing coil, a current transformer, a Hall effect device, or some other type of current sensor. When a Hall effect device is used, a source of DC power is provided as indicated at 142. The output of the sensing device 140 is applied to the signal input of a window comparator 144 by means of a signal line 146. The reference input of the comparator 144 is connected to the output of a DC reference voltage source 148 by means of a further signal line 150. The output of the comparator appears on line 86 and is applied as an input to the logic controller 41 of FIG. 3.

In operation, the sensing device 140 will produce a zero output on line 146 whenever the input and output currents on lines 36 and 42 are equal, since the inductively generated magnetic fields associated with the oppositely flowing currents in each phase leg will precisely cancel each other. When the input and output currents are unequal in one or more phases, however, a resultant magnetic field is produced within the sensing device 140 and causes an output to appear on line 146. In the event that the magnitude of this output exceeds the window established by the reference voltage level of the source 148, the output of the window comparator 144 on line 86 transitions from a low logic level to a high logic level. This output is coupled to the logic controller 41 of FIG. 3, which responds by removing all SCR drive signals in order to disconnect the load from the power sources 24, 26 and 28. The voltage output of the reference source 148 is preferably adjustable so that control may be exercised over the amount of current imbalance needed to produce an output on line 86.

Figure 9:
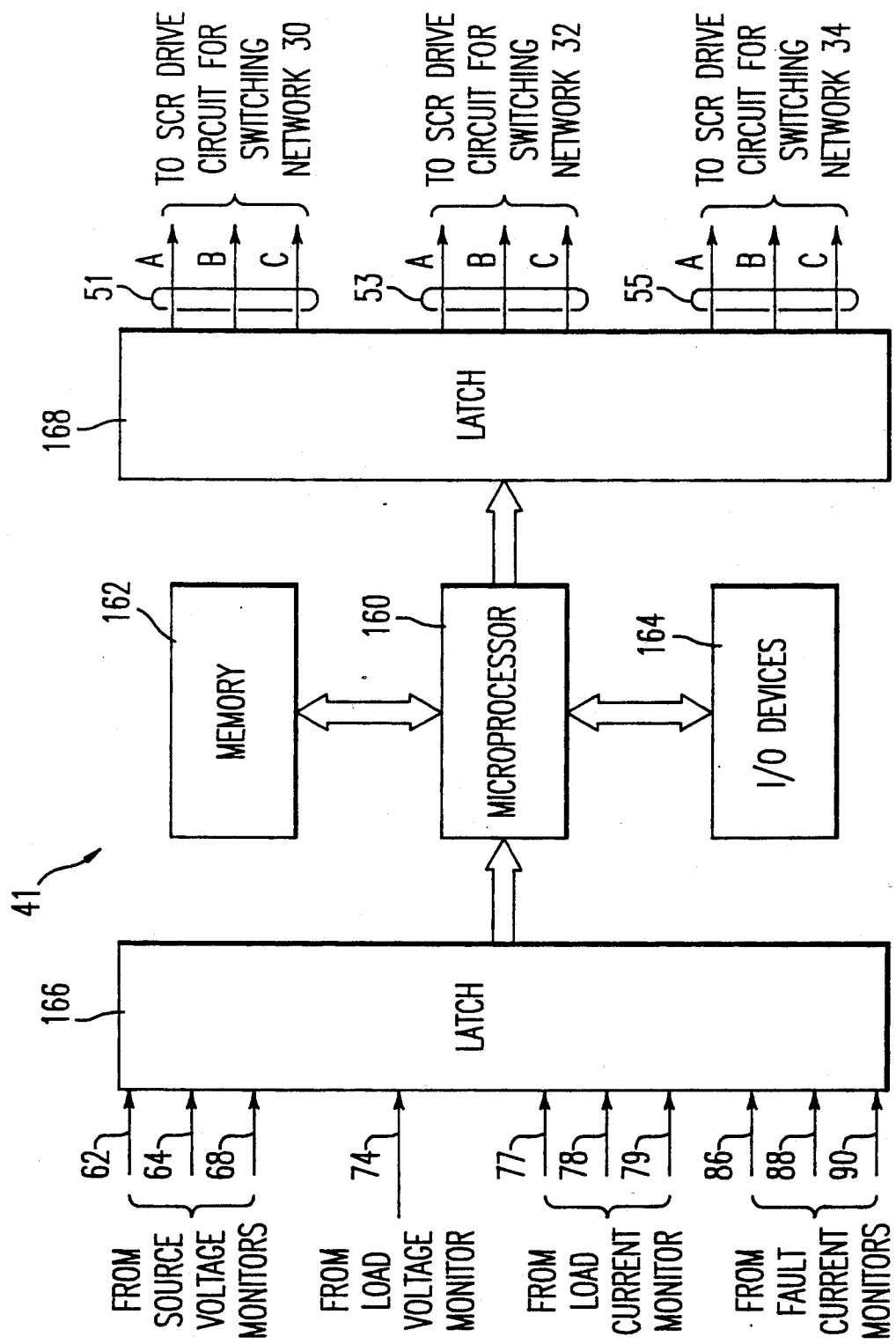
FIG. 9 is a block diagram of the logic controller used in the high speed transfer switch of FIG. 3.

FIG. 9 illustrates the details of the logic controller 41 of FIG. 3. The logic controller comprises a microprocessor 160, which may consist of a Z80 integrated microprocessor or the equivalent, and a memory 162 for storing control programs. The microprocessor 160 is connected to various input/output devices 164, which may consist of switches, pushbuttons, indicator lamps, and/or alphanumeric displays, together with appropriate interface and drive circuits. Among other functions, the input/output devices accept external transfer inputs that are entered manually by means of pushbuttons or automatically by means of signals received from other equipment. These external transfer conditions cause the system to execute a transfer to a designated alternate power source by changing the predetermined order of priority among the power sources. During the operation of the high speed transfer switch 20, the microprocessor 160 also receives inputs from a multistage input latch 166. The inputs to the latch 166 include the source voltage monitor outputs 62, 64 and 66, the load voltage monitor output 74, the load current monitor outputs 77, 78 and 79, and the fault current detector outputs 86, 88 and 90. Since these outputs may only appear momentarily, the latch 166 is used to insure that they will persist long enough to be recognized by the microprocessor 160. The latch 166 may be reset periodically by the microprocessor 160 or by an external clock signal. System control outputs from the microprocessor 160 are applied to a multistage output latch 168. The function of the output latch 168 is to store the output signals from the microprocessor 160 so that they can be used to provide steady-state input signals to the SCR drive circuit 43. The latch 168 has three groups of output lines 51, 53 and 55, one for each of the three power sources 24, 26, and 28. Each group consists of three separate lines which control the three phases A, B and C of the corresponding switching network 30, 32 or 34. These outputs are applied to corresponding inputs of the SCR drive circuit 43 in a manner which will now be described.

Figure 10:
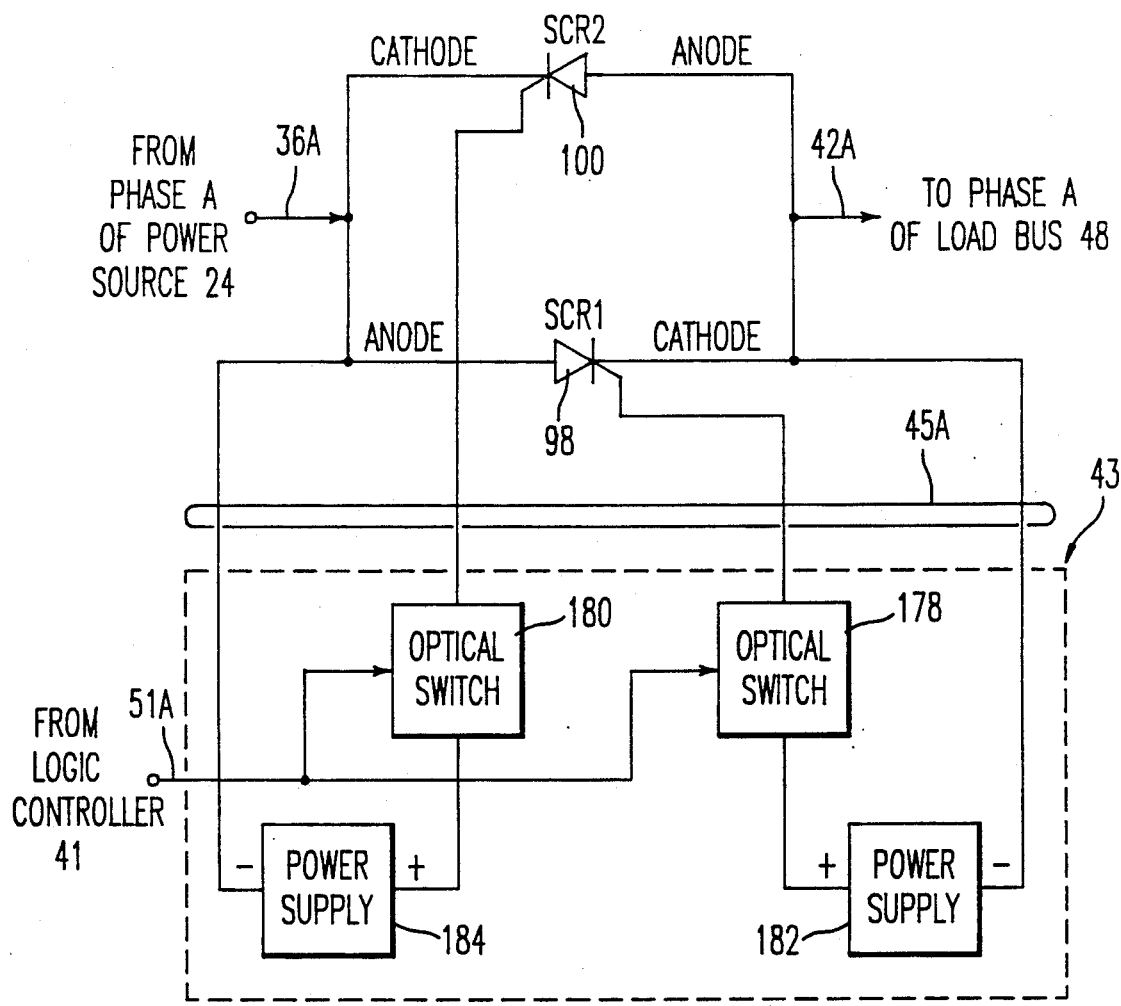
FIG. 10 is a schematic diagram of a portion of the SCR drive circuit used in the high speed transfer switch of FIG. 3.

FIG. 10 is a schematic diagram of the SCR drive circuit 43 of FIG. 3, together with two of the SCRs that are controlled by the drive circuit. In the interest of simplicity, the only circuit components shown are those associated with phase A of the first power source 24 and switching network 30. It will be understood that similar circuits are provided for phases B and C of the first power source 24 and switching network 30, and for each phase A, B and C of the remaining power sources 26 and 28 and switching networks 32 and 34. Therefore, a total of nine circuits of the type shown in FIG. 10 will be required to implement the system shown in FIG. 3, although certain components of these circuits may be shared as will be noted below.

With specific reference now to FIG. 10, the output 51A of the latch 168 in FIG. 9 is applied in parallel to the control inputs of two optically triggered switches 178 and 180. The switch 178 has one terminal connected to the gate of the SCR 98, and the other terminal connected to the positive side of an isolated power supply 182. The negative side of the power supply 182 is connected to the cathode of the SCR 98. In a similar manner, the switch 180 has one terminal connected to the gate of the SCR 100 and the other terminal connected to the positive side of a second isolated power supply 184. The negative side of the power supply 184 is connected to the cathode of the SCR 100. When the logic controller 41 of FIG. 9 causes the output line 51A to transition to a high logic level, the switches 178 and 180 are both rendered conductive. As a result, the power supplies 182 and 184 apply gate drive to the respective SCRs 98 and 100, thereby rendering both SCRs conductive. This allows A.C. current to flow through phase A of the SCR switching network 30 from the first power source 24 to the load 22. The use of isolated power supplies 182, 184 allows each power supply to be electrically tied to the cathode of the corresponding SCR 98 or 100, so that the D.C. gate drive signal will float with respect to the A.C. potential impressed on the cathode by the first power source 24. The optical isolation provided by the switches 178, 180 allows the logic controller 41 to supply gate drive to the SCRs 98, 100 without regard to their electrical potentials, and prevents the occurrence of fault paths between the SCR drive circuits and the logic controller. If desired, various types of capacitive, inductive or transformer-type isolation devices can be substituted for the optically triggered switches 178, 180.

Figure 11A:
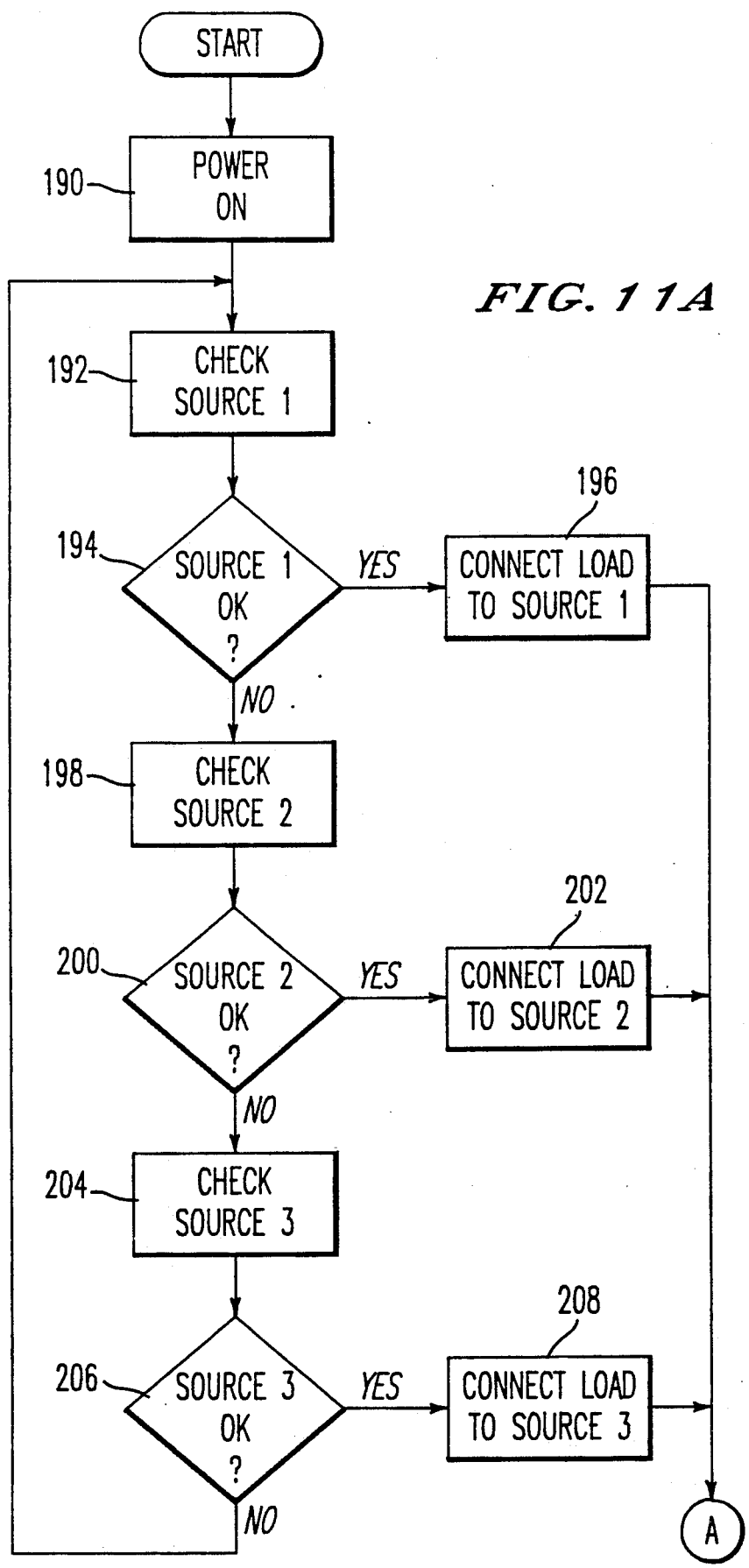
FIG. 11 is a flow chart illustrating the sequence of operations carried out by the logic controller of FIG. 3 in response to various input conditions.
Figure 11B:
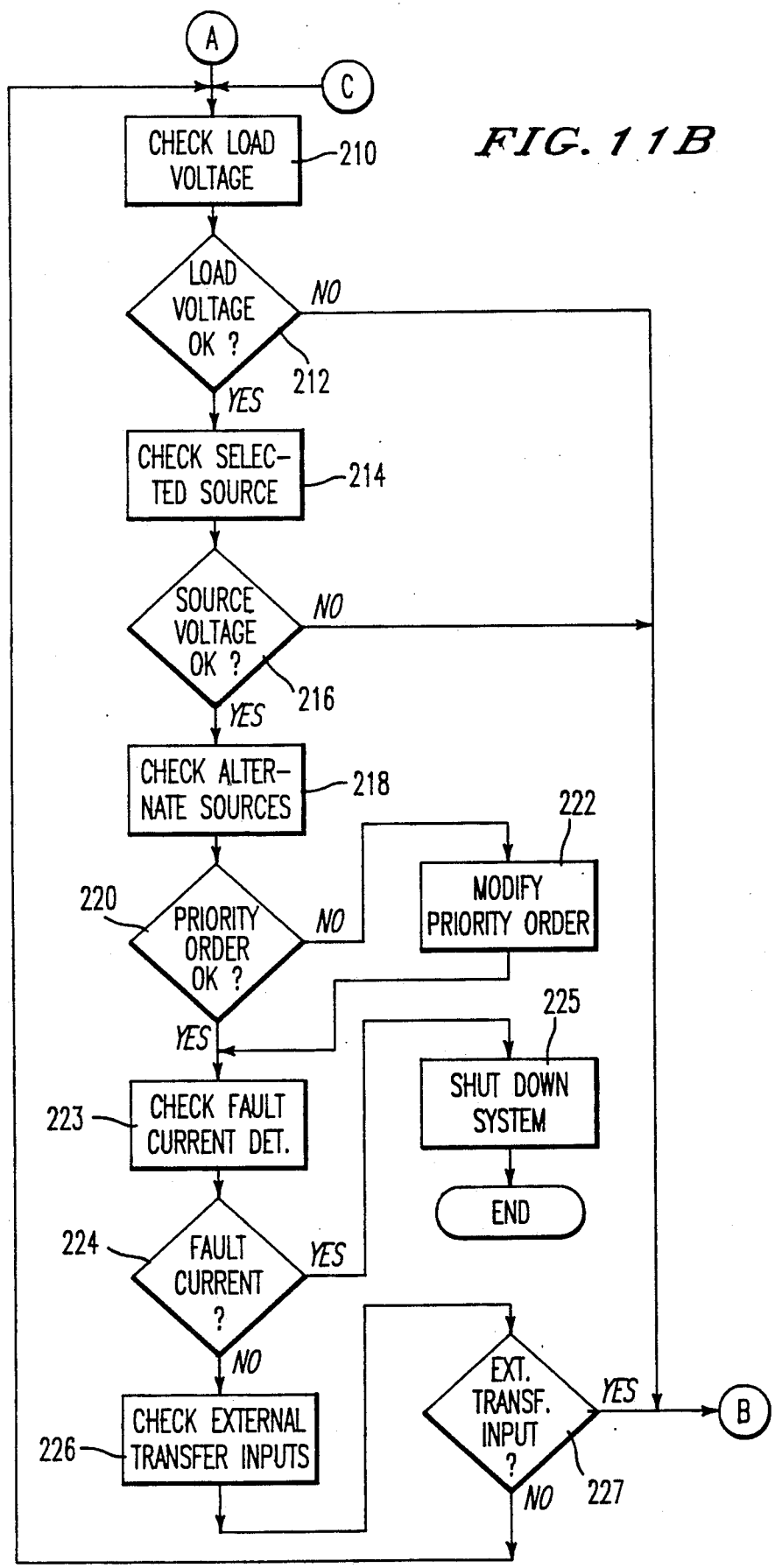
Figure 11C:
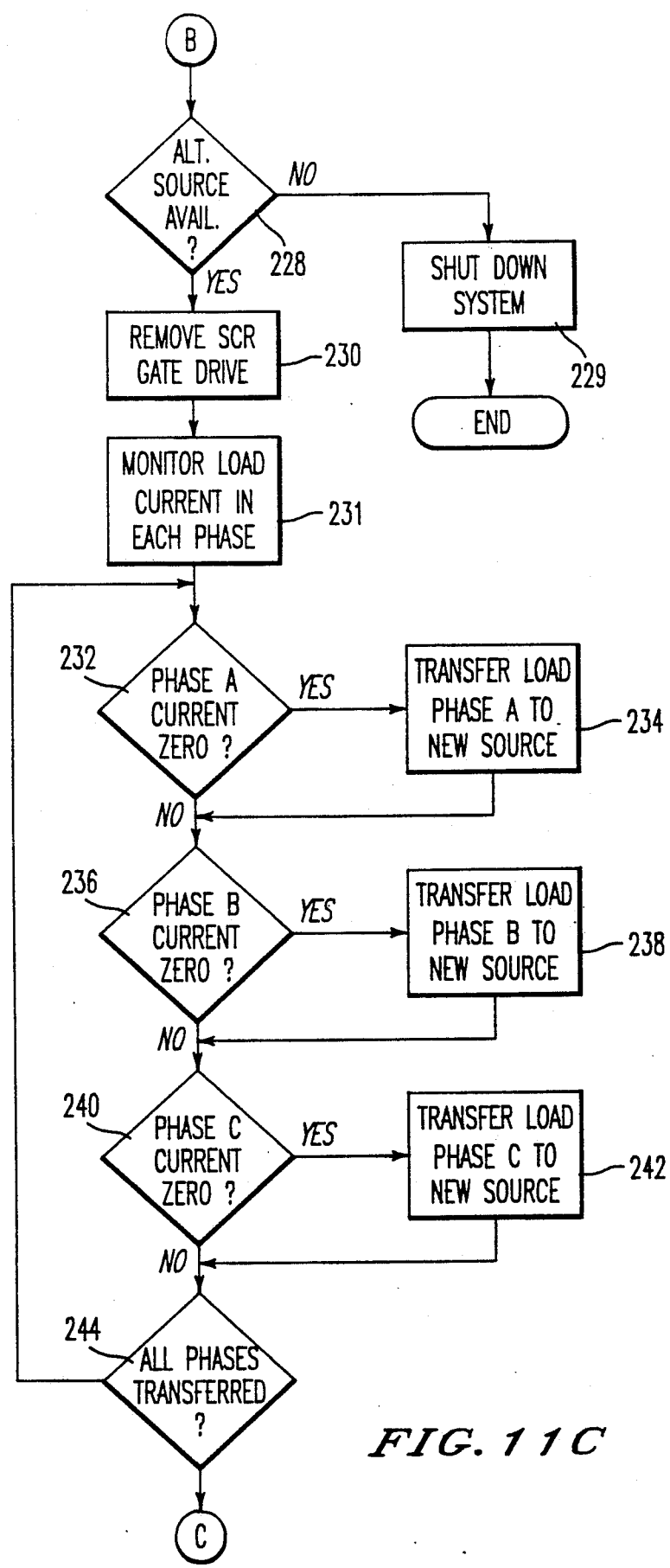

FIG. 11 is a flow chart which illustrates the sequence of operations carried out by the microprocessor-based logic controller 41 of FIG. 9. The sequence begins with a start block 190, in which power is applied to the logic controller 41 and certain initialization and program loading routines are performed. The program then proceeds to block 192, which represents the beginning of a program sequence that initially selects one of the three power sources 24, 26 or 28 of FIG. 3 based on a predetermined order of priority. The order of priority will typically be established in the system software, but it may also be controlled or overridden by a manual input. For the purpose of the present example, the current priority order will be assumed to consist of the first source 24, followed by the second source 26, followed in turn by the third source 28. In block 192, the logic controller checks the status of the first power source 24 by reading the logic level on the output line 62 of the source voltage monitor 50. In decision block 194, this logic level is used to determine whether a voltage fault exists in the first power source 24. If no fault is detected, the program proceeds to block 196 and connects the first power source 24 to the load 22 by simultaneously gating on all phases of the SCR switching network 30. If a fault is detected, the program proceeds instead to block 198 and checks for voltage faults in the second power source 26 based on the output of the source voltage monitor 52. If no fault is detected in decision block 200, the program proceeds to block 202 and connects the second power source 26 to the load 22 by simultaneously gating on all phases of the SCR switching network 32. If a fault is detected, the program instead proceeds to block 204 and checks for voltage faults in the third power source 28. As before, if no fault is detected in block 206, the program proceeds to block 208 and connects the third power source 28 to the load 22 by gating on all phases of the SCR switching network 34. Otherwise, the program returns to block 192 and again checks for faults in the first power source 24. The program loop comprising blocks 192 through 208 will continue until one of the power sources is found to be satisfactory, or until a predetermined number of loops has been executed. In the latter case, the logic controller may initiate a system shut-down and may also activate an external display to indicate that power cannot be delivered to the load 22.

Assuming that the initialization routine described above has resulted in one of the power sources 24, 26 or 28 being connected to the load 22, the program proceeds to block 210 and checks the load voltage by reading the logic level on the output line 74 of the load voltage monitor 70 (FIG. 3). If the output of the load voltage monitor is found in decision block 212 to be abnormal, indicating a probable fault condition in one of the SCR switching networks 30, 32 or 34 or in the SCR drive circuit 43, a load transfer is initiated in a manner to be described shortly. Otherwise, the program proceeds to block 214 and checks the currently selected source for voltage faults by reading the logic level at the output of the corresponding source voltage monitor 50, 52 or 54. If a voltage fault is detected in decision block 216, a load transfer is initiated. Otherwise, the program proceeds to block 218 and checks for voltage faults in each of the alternate power sources (i.e., the two power sources not currently connected to the load 22). In decision block 220, a determination is made as to whether any faults that may exist in the alternate sources will necessitate a change in the priority order of the alternate sources. This may occur, for example, if a fault is detected in the second power source 26 while the first power source 24 is connected to the load 22. In that event, the priority order of the alternate sources 26 and 28 is reversed so that the third power source 28 (rather than the second power source 26) is selected first in the event of a load transfer. The modification of the priority order between the alternate sources, as represented by block 222, insures that the load 22 will be connected immediately to a properly functioning backup source in the event that the primary source experiences a failure. It will be readily appreciated that a priority order can be maintained among any number of backup sources, and hence the present invention is not limited to three power sources as shown in FIG. 3.

Assuming that the current priority order between the alternate power sources is found to be correct in decision block 220, the program proceeds to block 223 and checks to determine whether a fault current exists in the currently selected switching network 30, 32 or 34 by reading the logic level at the output of the corresponding fault current detector 80, 82 or 84. If a fault current is detected in decision block 224, a system shut-down is initiated in block 225. Otherwise, the program proceeds to block 226 and checks for the existence of an external transfer condition. An external transfer condition will result from a manual or other external input to the microprocessor 160 of FIG. 9, changing the existing order of priority among the power sources. If such a condition is detected in decision block 227, a load transfer to the designated power source is initiated in the manner described below. Otherwise, the program returns to block 210 and again checks the output of the load voltage monitor 70 of FIG. 3. During steady-state operation of the high speed transfer switch 20 (i.e., in the absence of a load or source voltage fault or an external transfer condition), the program loop consisting of blocks 210 through 227 is executed repeatedly until the system is manually shut down.

As noted in the previous description, a load transfer may be initiated as a result of a load voltage fault (block 212), a source voltage fault (block 216), or an external transfer condition (block 227). Any of these occurrences will cause the program to enter the transfer sequence beginning with decision block 228. In this block, a determination is made as to whether an alternate power source is available for the load transfer. This will not be the case if, for example, source voltage faults have been found to exist in all of the available power sources, or if the transfer is being attempted to a power source from which the load has already been removed due to an abnormal load voltage indication. In either of these situations, the program proceeds to block 229 and a system shut-down is initiated. However, if the determination in decision block 228 produces a positive result, the load is transferred to the next power source in the current order of priority. In block 230, the logic controller initiates the load transfer by simultaneously removing the gate drive from all of the SCR pairs in the particular switching network 30, 32 or 34 that is associated with the power source currently connected to the load 22. The logic controller then monitors the line current in each phase A, B and C of the load by continuously and sequentially checking the phase A, B and C outputs 77, 78 and 79 of the load current monitor 76 of FIGS. 3 and 7. This operation is represented in block 231 of the program sequence. In decision block 232, a determination is made as to whether the current in phase A of the load has reached zero. If it has, that phase of the load is transferred to the corresponding phase of the new power source by gating on the SCR pair associated with phase A of the new source. This operation is represented in program block 234. After the transfer of phase A is complete, or in the event that the load voltage in phase A has not reached zero, the program proceeds to decision block 236. In this block, a determination is made as to whether the current in phase B of the load has reached zero. If it has, phase B of the load is transferred to phase B of the new power source by gating on the phase B SCR pair in the switching network associated with the new power source. After the phase B transfer is complete, or in the event that the current in phase B of the load has not yet reached zero, the program proceeds to decision block 240. In this block, a determination is made as to whether the current in phase C of the load has reached zero. If it has, phase C of the load is transferred to phase C of the new power source by gating on the corresponding SCR pair in the switching network associated with the new power source. After the phase C transfer is complete, or in the event that the current in phase C of the load has not yet reached zero, the program proceeds to decision block 244. In this block, a determination is made as to whether all phases A, B and C of the load have been reconnected to the corresponding phases of the new power source. If so, the load transfer is complete and the program re-enters the monitoring loop at block 210 to check for any faults which may occur in the new power source. Otherwise, the program returns to decision block 232. The program loop represented by blocks 232 through 244 will continue until the load has been completely transferred to the new power source, or until a predetermined number of loops has been executed. In the latter case, the logic controller 41 may initiate a system shut-down and may also activate an external display to indicate that a fault has occurred in the transfer sequence.

It will be appreciated from the foregoing description that the specific sequence in which the load phases are transferred will depend upon the phase angle of the old power source when the transfer condition is detected. The sequence of phase connections can occur in the direction A - B - C - A or alternatively in the direction A - C - B - A. In either case, the load phases are always connected to the power source phases in the proper manner, that is, load phase A is connected to power source phase A, load phase B is connected to power source phase B, and load phase C is connected to power source phase C. Phase rotation of the power supplied to the load will always follow that of the power sources, and hence phase rotation checking circuitry is not required.

If the old power source should decay rapidly or drop away suddenly before the load transfer can be completed in the normal manner, the load current monitor 76 of FIGS. 3 and 7 will immediately detect zero current in each phase and will cause the logic controller to reconnect all phases of the load to the corresponding phases of the new power source at essentially the same time. Reconnection of the new power source in this manner will restore power to the load quickly and thus minimize any equipment disturbances.

When the present invention is implemented with currently available types of solid state switching devices, the individual phase transfer events persist for less than 200 microseconds and are not dependent on the shape of the load current waveform. During the transfer of the load between power sources, the load utilizes energy from different phases of the two sources. Interaction between the power sources does not occur, since each load phase is never connected to more than one power source phase at any given time. This allows the present invention to be retrofitted into existing systems with a minimum of redesign and installation effort.

The wye-connected load and source configuration utilized in the present invention allows multiple independent power sources to feed a single load without causing a significant overvoltage condition to occur. The two sources are each tied to ground by their neutral terminals and are therefore electrically referenced to the same ground potential. During the load transfer sequence, there is a transition or shifting in the relative angular position of the phase voltages at the load. This condition can result in the addition of the phase voltages, with the sum approaching twice the nominal phase voltage. In wye-connected power systems, however, the phases are normally added vectorially by the factor of 1.732, which reduces the overvoltage to approximately 115% of the nominal line-to-line value. This overvoltage only occurs in the worst case condition and persists for less than ⅛ of a power cycle.

In practical implementations of the present invention, the load current monitor 76 of FIGS. 3 and 7 may be modified so that, in addition to checking for a zero current condition in each of the load phases, it also produces an output when the load current exceeds a predetermined maximum value (alternatively, a separate load current monitor may be provided for this purpose). Excess load current will usually indicate a short circuit or other fault condition in the load 22, and it will usually be desirable to cause the logic controller 41 to initiate a complete shut-down of the system when such excess current is detected.

Although the present invention has been described with reference to a preferred embodiment, it should be understood that the invention is not limited to the details thereof. Various substitutions and modifications have been suggested in the foregoing detailed description, and others will occur to those of ordinary skill in the art. All such substitutions and modifications are intended to fall within the spirit and scope of the invention as defined in the appended claims.

What is claimed is:

1. A high speed transfer switch for transferring a multiphase load between first and second multiphase A.C. power sources, comprising:
   switching means for selectively connecting each phase of said load to the corresponding phase of said first or second power source;
   load current monitoring means for detecting a zero current condition in each phase of said load; and
   control means coupled to said switching means and to said load monitoring means, said control means being responsive to a detected transfer condition to cause said switching means to independently transfer each phase of the load from the first power source to the second power source immediately upon detection of a zero current condition in said phase by said load current monitoring means.

2. A high speed transfer switch as claimed in claim 1, wherein said detected transfer condition comprises an external transfer condition.

3. A high speed transfer switch as claimed in claim 1, further comprising first power source monitoring means for detecting a fault condition in each phase of said first power source, an wherein said detected transfer condition comprises a fault condition detected by said first power source monitoring means.

4. A high speed transfer switch as claimed in claim 1, wherein said switching means comprises a first plurality of self-commutating switching devices associated with the respective phases of said first power source and a second plurality of selfcommutating switching devices associated with the respective phases of said second power source, each of said switching devices being rendered conductive in response to a gating signal produced by said control means and automatically reverting to a nonconducting state when the gating signal is removed and the current passing through the switching device becomes zero, and wherein said control means responds to said detected condition by simultaneously removing gating signals from the switching devices associated with all phases of the first power source, and by selectively applying gating signals to the switching device associated with each phase of the second power source when said load monitoring means detects a zero current condition in said phase.

5. A high speed transfer switch as claimed in claim 4, wherein each of said self-commutating switching devices comprises a solid state four-layer device.

6. A high speed transfer switch as claimed in claim 4, wherein each of said self-commutating switching devices comprises a pair of silicon controlled rectifiers connected in an antiparallel configuration, and wherein the silicon controlled rectifiers of each pair are gated simultaneously by said control means.

7. A high speed transfer switch as claimed in claim 4, wherein each of said self-commutating switching devices comprises a triac.

8. A high speed transfer switch as claimed in claim 3, wherein the fault condition detected by said first power source monitoring means comprises an abnormal source voltage.

9. A high speed transfer switch as claim in claim 3, wherein the fault condition detected by said first power source monitoring means comprises an abnormal source frequency.

10. A high speed transfer switch as claimed in claim 8, wherein said first power source monitoring means comprises:
   a rectifier having an input connected to said power source and an output;
   an integrator having an input connected to the output of said rectifier and an output;
   a reference voltage source having an output; and
   a voltage comparator having a first input connected to the output of said integrator, a second input connected to the output of said reference voltage source, and an output connected to said control means.

11. A high speed transfer switch as claimed in claim 10, wherein the output of said reference voltage source is adjustable.

12. A high speed transfer switch as claimed in claim 3, further comprising second power source monitoring means coupled to said control means for detecting a fault condition in each phase of said second power source, said control means being responsive to a fault condition detected by said second power source monitoring means to prevent transfer of the load to the second power source.

13. A high speed transfer switch as claimed in claim 12, further comprising a third multiphase A.C. power source connectable to said load by said switching means in the same manner as said first and second power sources, and wherein said control means is responsive to a fault condition detected by said first power source monitoring means to transfer the load from the first power source to the third power source in the event that a fault condition is also detected by said second power source monitoring means.

14. A high speed transfer switch as claimed in claim 1, further comprising a fault current detector coupled to said control means for detecting a fault current in said switching means, and wherein said control means is responsive to an output from said fault current detector to disconnect said first and second power sources from said load.

15. A high speed transfer switch as claimed in claim 14, wherein said fault current detector comprises a current summing device for comparing the input current flowing from the connected power source to the switching means with the output current flowing from the switching means to the load, and for producing an output when the difference between said input and output currents exceeds a predetermined value.

16. A high speed transfer switch as claimed in claim 15, wherein said current summing device comprises:
   a current sensing device placed in proximity to the lines carrying said input and output currents, and having an output;
   a reference voltage source having an output; and
   a voltage window comparator having a first input connected to the output of said current sensing device, a second input connected to the output of said reference voltage source, and an output coupled to said control means.

17. A high speed transfer switch as claimed in claim 16, wherein the output of said reference voltage source is adjustable.

18. A high speed transfer switch as claimed in claim 1, further comprising a load voltage monitor coupled to said control means for detecting an abnormal load voltage and for producing transfer condition to cause transfer of the load from the first power source to the second power source.

19. A high speed transfer switch as claimed in claim 18, wherein said load voltage monitor comprises:
   a rectifier having an input connected to said load and an output;
   an integrator having an input connected to the output of said rectifier and an output;
   a reference voltage source having an output; and
   a voltage comparator having a first input connected to the output of said integrator, a second input connected to the output of said reference voltage source, and an output connected to said control means.

20. A high speed transfer switch as claimed in claim 19, wherein the output of said reference voltage source is adjustable.

21. A high speed transfer switch as claimed in claim 1, wherein said load current monitoring means comprises, for each phase of said load:
   a current sensing device placed in proximity to the line carrying current to said load phase, and having an output;
   a voltage divider having an input connected to the output of said current sensing device, and having an output;
   a reference voltage source having an output; and
   a voltage window comparator having a first input connected to the output of said voltage divider, a second input connected to the output of said reference voltage source, and an output coupled to said control means.

22. A high speed transfer switch as claimed in claim 21, wherein the output of said reference voltage source is adjustable.

23. A method for transferring a multiphase load between first and second multiphase A.C. power sources, comprising the steps of:
   detecting a condition requiring transfer of said load from said first power source to said second power source;
   monitoring the current in each phase of said load in order to detect the occurrence of a zero current condition in each of said load phases; and
   independently transferring each phase of said load from said first power source to said second power source immediately upon detection of a zero current condition in said phase.

24. The method of claim 23, wherein the step of independently transferring each phase of said load from said first power source to said second power source comprises the steps of:
simultaneously removing gating signals from self-commutating switching devices associated with the respective phases of said first power source; and
    selectively applying gating signals to self-commutating switching devices associated with each phase of said second power source when a zero current condition is detected in said phase.

25. The method of claim 23, further comprising the stp of monitoring each phase of said first power source in order to detect a fault condition, and wherein the step of detecting said transfer condition comprises detecting said fault condition.

26. The method of claim 25, wherein the step of detecting said fault condition comprises detecting an abnormal source voltage.

27. The method of claim 25, wherein the step of detecting said fault condition comprises detecting an abnormal source frequency.

28. The method of claim 25, further comprising the steps of:
    monitoring each phase of said second power source in order to detect a fault condition in said second power source; and
    upon detection of a fault condition in said second power source, preventing transfer of the load from said first power source to said second power source.

29. The method of claim 28, further comprising the steps of:
    monitoring each phase of a third multiphase A.C. power source connectable to said load; and
    upon detection of a fault condition in said first power source, transferring the load from said first power source to said third power source in the event that a fault condition is also detected in said second power source.

30. The method of claim 23, further comprising the steps of:
    monitoring the operation of switching means interconnecting said load with said first and second power sources in order to detect a fault condition in said switching means; and
    upon detection of a fault condition in said switching means, disabling said switching means in order to disconnect said load from said first and second power sources.

31. The method of claim 30, wherein the step of detecting said fault condition comprises detecting an abnormal current in said switching means.

32. The method of claim 31, wherein the step of detecting an abnormal current in said switching means comprises the steps of:
    comparing the input current flowing from the connected power source to the switching means with the output current flowing from the switching means to the load; and
    determining whether the difference between said input and output currents exceeds a predetermined value.

33. The method of claim 23, further comprising the step of monitoring each phase of said load in order to detect a fault condition, and wherein the step of detecting said transfer condition comprises detecting said fault condition.

34. The method of claim 33, wherein the step of detecting said fault condition comprises detecting an abnormal load voltage.

35. A high speed transfer switch for transferring a multiphase load between first and second multiphase A.C. power sources, comprising:
    switching means for selectively connecting said load to said first or second power source;
    a fault current detector for detecting a fault current in said switching means; and
    control means coupled to said switching means and to said fault current detector, said control means being responsive to the detection of a fault current by said fault current detector to disable said switching means in order to disconnect said load from said first and second power sources.

36. A high speed transfer switching as claimed in claim 35, wherein said fault current detector comprises a current summing device for comparing the input current flowing from the connected power source to the switching means with the output current flowing from the switching means to the load, and for producing an output when the difference between said input and output currents exceeds a predetermined value.

37. A high speed transfer switch as claimed in claim 36, wherein said current summing device comprises:
    a current sensing device placed in proximity to the lines carrying said input and output currents, and having an output;
    a reference voltage source having an output; and
    a voltage window comparator having a first input connected to the output of said current sensing device, a second input connected to the output of said reference voltage source, and an output coupled to said control means.

38. A high speed transfer switching as claimed in claim 37, wherein the output of said reference voltage source is adjustable.

39. A high speed transfer switch as claimed in claim 37, wherein said current sensing device comprises a Hall effect device.

40. A method for operating a high speed transfer switch for transferring a multiphase load between first and second multiphase A.C. power sources, comprising the steps of:
    monitoring the operation of switching means interconnecting said load with said first and second power sources in order to detect a fault current in said switching means; and
    upon detection of a fault current in said switching means, disabling said switching means in order to disconnect said load from said first and second power sources.

41. The method of claim 40, wherein the step of detecting a fault current in said switching means comprises the steps of:
    comprising the input current flowing from the connected power source to the switching means with the output current flowing from the switching means to the load; and
    determining whether the difference between said input and output currents exceeds a predetermined value.

42. The method of claim 41, wherein the step of comparing said input and output currents comprises summing said currents.

43. A high speed transfer switch for transferring a multiphase load among first, second and third multiphase A.C. power sources, comprising:

switching means for connecting said load to any one of said first, second and third power sources;

control means coupled to said switching means, said control means being responsive to a detected transfer condition to cause said switching means to transfer said load from one of said power sources to another of said power sources based on a predetermined order of priority among said first, second and third power sources.

44. A high speed transfer switch as claimed in claim 43, wherein said detected transfer condition comprises an external transfer condition.

45. A high speed transfer switch as claimed in claim 43, further comprising power source monitoring means for detecting fault conditions in said first, second and third power sources, and wherein said transfer condition comprises a fault condition detected by said power source monitoring means in the power source connected to the load.

46. A high speed transfer switch as claimed in claim 45, wherein said control means is responsive to a fault condition detected by said power source monitoring means in a power source not connected to the load to modify said predetermined order of priority.

47. A method for transferring a multiphase load among first, second and third multiphase A.C. sources, comprising the steps of:

initially connecting said load to one of said first, second and third power sources;

detecting a condition requiring transfer of said load to another of said first, second and third power sources; and upon detection of said transfer condition, transferring said load to another of said first, second and third power sources based upon a predetermined order of priority among said power sources.

48. The method of claim 47, further comprising the step of detecting fault conditions in said first, second and third power sources, and wherein the step of detecting said transfer condition comprises detecting a fault condition in the power source connected to the load.

49. The method of claim 48, further comprising the step of modifying said predetermined order of priority in response to a fault condition detected in a power source not connected to the load.

* * * * *